(12) United States Patent
Hebenstreit et al.

(10) Patent No.: US 7,992,464 B2
(45) Date of Patent: Aug. 9, 2011

(54) STEERING COLUMN ARRANGEMENT

(75) Inventors: Axel Hebenstreit, Stuttgart (DE); Hans-Dieter Loeffler, Reutlingen (DE); Markus Mauch, Aichwald (DE)

(73) Assignee: Daimler AG, Stuttgart (DE)

( * ) Notice: Subject to any disclaimer, the term of this patent is extended or adjusted under 35 U.S.C. 154(b) by 586 days.

(21) Appl. No.: 10/539,594

(22) PCT Filed: Oct. 14, 2003

(86) PCT No.: PCT/EP03/11332
§ 371 (c)(1), (2), (4) Date: Oct. 18, 2006

(87) PCT Pub. No.: WO2004/054868
PCT Pub. Date: Jul. 1, 2004

(65) Prior Publication Data
US 2007/0039402 A1    Feb. 22, 2007

(30) Foreign Application Priority Data
Dec. 18, 2002 (DE) .................. 102 59 167

(51) Int. Cl.
*B62D 1/16* (2006.01)
*G05G 11/00* (2006.01)

(52) U.S. Cl. ........................ 74/492; 74/484 R
(58) Field of Classification Search .................. 74/492, 74/493, 484 R; 280/775, 777
See application file for complete search history.

(56) References Cited

U.S. PATENT DOCUMENTS

| | | | | |
|---|---|---|---|---|
| 2,580,118 | A | * | 12/1951 | Mercier .................. 403/384 |
| 3,877,319 | A | * | 4/1975 | Cooper .................. 74/492 |
| 4,277,658 | A | | 7/1981 | Delp et al. |
| 4,368,454 | A | * | 1/1983 | Pilatzki .................. 74/484 R |
| 6,131,481 | A | * | 10/2000 | Wilson et al. .................. 74/493 |
| 6,318,756 | B1 | * | 11/2001 | Papandreou .................. 280/775 |
| 6,492,744 | B1 | * | 12/2002 | Rudolph et al. .................. 307/10.1 |
| 6,830,267 | B2 | * | 12/2004 | Budaker et al. .................. 280/775 |
| 6,892,602 | B2 | | 5/2005 | Hirschfeld et al. |

FOREIGN PATENT DOCUMENTS

| | | |
|---|---|---|
| DE | 28 10 790 A1 | 9/1979 |
| DE | 39 40 391 C1 | 4/1991 |
| DE | 197 00 175 A1 | 4/1998 |
| DE | 102 05 270 C1 | 4/2003 |
| EP | 0 831 008 A1 | 3/1998 |
| EP | 1108637 A1 * | 6/2001 |
| EP | 1 403 168 A2 | 3/2004 |

OTHER PUBLICATIONS

International Search Report dated Feb. 11, 2004 including English translation of relevant portion (Five (5) pages).
European Search Report dated Jun. 22, 2007 with English Translation (Eleven (11) pages).

* cited by examiner

*Primary Examiner* — Thomas R Hannon
*Assistant Examiner* — Alan B Waits
(74) *Attorney, Agent, or Firm* — Crowell & Moring LLP

(57) ABSTRACT

A steering column arrangement having a steering spindle (2) which is mounted in a casing tube (3, 5) so as to be rotationally movable, and having a switch module (7) which is held immovably with respect to the steering spindle (2). The switch module (7) is fixed radially and axially on the casing tube (3), the switch module (7) being supported on a bearing (12) which is arranged on the steering spindle. The Switch module comprises a centering device (8) which, under action of a force (F) which is oriented coaxially with respect to the longitudinal axis (L) of the steering spindle (2), fixes the switch module (7) on the casing tube (3).

18 Claims, 2 Drawing Sheets

STEERING COLUMN ARRANGEMENT

BACKGROUND AND SUMMARY OF THE INVENTION

This invention relates to a steering column arrangement.

DE 197 00 175 A1 discloses a steering column arrangement which comprises a steering spindle mounted in a casing tube so as to be rotationally movable. A switch module is fixed radially and axially on the casing tube at that end of the steering spindle which protrudes into the vehicle interior. As a result, the switch module is held immovable with regard to the steering spindle. For this purpose, the switch module is supported on a bearing which is arranged on the steering spindle.

The switch module is secured axially on the casing tube via a bayonet closure, while the radial fixing is effected via a clip which surrounds the casing tube.

The mounting of the switch module thus requires two steps, and even small tolerance deviations of the components can make it impossible to connect contacts of electronic components which are integrated in the switch module, such as a steering angle sensor, correctly to the steering wheel.

It is an object of the invention to provide a steering column arrangement which simplifies the mounting of a switch module and ensures reliable connection of the switch module to the steering wheel.

According to the invention, the object is achieved by a steering column arrangement that includes a steering spindle mounted in a casing tube so as to be rotationally movable, and a switch module which is held immovably with respect to the rotational movement of the steering spindle and is fixed radially and axially on the casing tube. The switch module is supported on a bearing which is arranged on the steering spindle, and comprises a centering device which, under a force which is oriented coaxially with respect to the longitudinal axis of the steering spindle, fixes the switch module on the casing tube and clamps it radially.

The steering column arrangement comprises a steering spindle which is mounted in a casing tube so as to be rotationally movable and a switch module which is held immovably with respect to the steering spindle and is fastened to the casing tube. According to the invention, the switch module is equipped with a centering device and a bearing, and is supported on the steering spindle via the bearing. The action of a force which is oriented coaxially with respect to the longitudinal axis of the steering spindle on the centering device makes it possible for the switch module to be moved during mounting in the axial position as far as an end position, such that it is oriented radially automatically in the process. Here, it is of advantage that only one step, the application of a coaxially acting force, is sufficient to fasten the switch module to the casing tube. At the same time, the switch module is pulled to the steering wheel by the application of the axial force, so that there can be no axial movement between the switch module and the steering wheel. In addition, it is possible to virtually preclude rotation or tilting of the switch module, so that the steering angle sensor which is integrated, for example, in the switch module is thus mounted in a fault-free manner.

In one refinement, the centering device comprises a stator and clamping jaws which interact during application of the axial force, in such a way that the switch module is centered automatically on the casing tube.

The stator can be connected to the bearing in order to support the switch module on the steering spindle, such that the switch module is held immovably during rotation of the steering wheel.

For uniform introduction of the axially acting force to the clamping jaws, the stator can be connected to each clamping jaw via a spring element in one preferred embodiment.

As each clamping jaw is pulled fixedly to the casing tube by way of a support, the switch module can be secured axially on the casing tube under the action of the axial force.

That face of the clamping jaw which faces the stator advantageously extends obliquely with regard to the longitudinal axis of the steering spindle, so that the stator which is moved in the opposite direction to the clamping jaw brings the clamping jaw into contact with the casing tube.

This effect can be reinforced if the inner face of the stator extends parallel to the oblique face of the clamping jaw.

An elevation which protrudes from that face of the clamping jaw which faces the casing tube can be pressed to a more or less pronounced extent into the casing tube during mounting, as a function of the force which is acting on it, ensuring reliable holding of the switch module on the casing tube.

The axial force can advantageously be applied by means of a steering wheel bolt. This has the advantage that, using a method step which is necessary in any case (the fixing of the steering wheel to the steering spindle), the switch module can be fixed at the same time.

A leaf spring which engages in a cut-out of the casing tube is provided on the stator as a radial securing means of the switch module, which radial securing means can at the same time serve during mounting as a captive securing means.

Other objects, advantages and novel features of the present invention will become apparent from the following detailed description of the invention when considered in conjunction with the accompanying drawings.

BRIEF DESCRIPTION OF THE DRAWINGS

In the following text, one preferred refinement will be explained using the drawing, in which.

DETAILED DESCRIPTION OF THE DRAWINGS

Figure 1A:
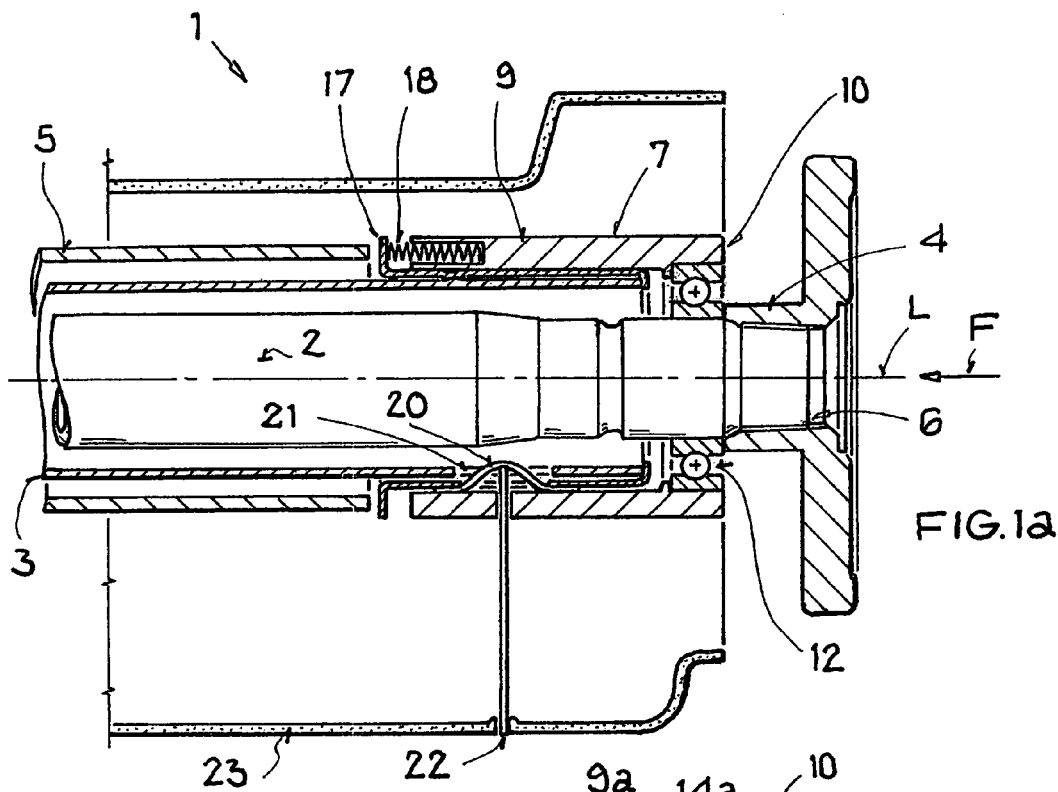
FIG. 1a shows a longitudinal section through a steering column arrangement.
Figure 1B:
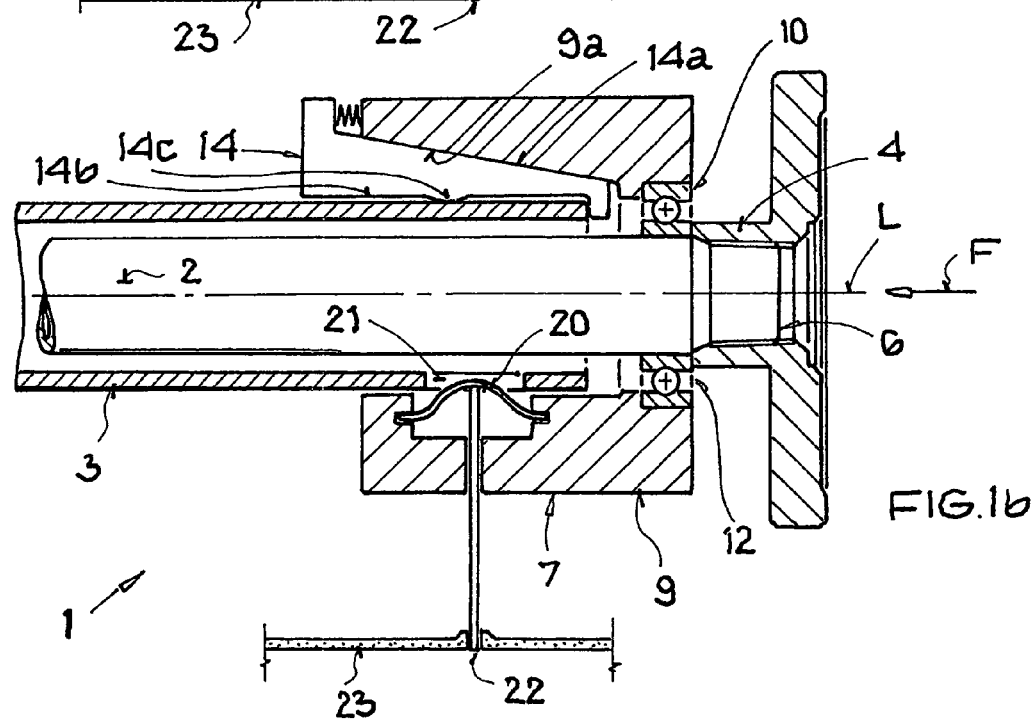
FIG. 1b shows a detailed illustration according to FIG. 1.
Figure 2:
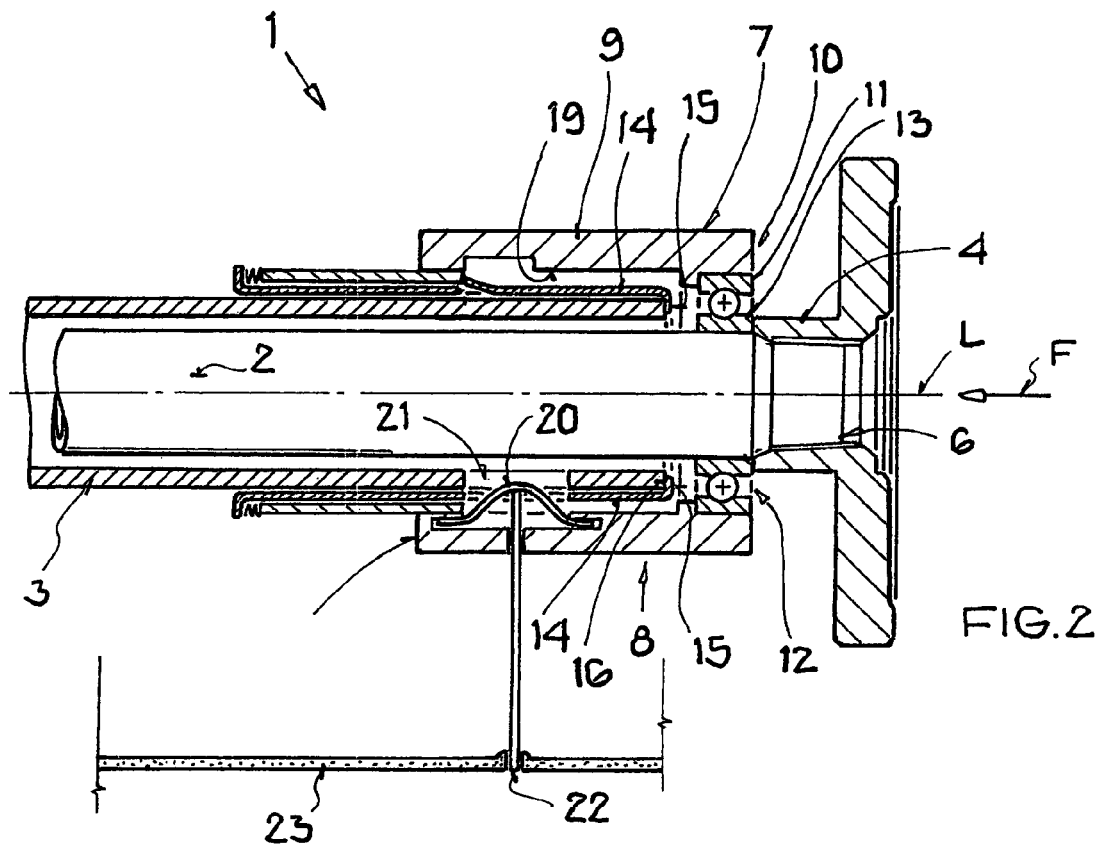
FIG. 2 shows an enlarged illustration according to FIG. 1.

FIGS. 1 and 2 show a longitudinal section through a steering column arrangement 1 having a steering spindle 2 and an inner casing tube 3 which is arranged coaxially with respect to the steering spindle 2. For comfort adjustment of a steering wheel (of which only a steering wheel hub 4 is shown here), an outer casing tube 5 is mounted so as to be movable relative to the inner casing tube 3.

The steering wheel hub 4 is fit coaxially with respect to the steering spindle 2 onto its end 6 which faces the vehicle interior. The end 6 of the steering spindle 2 is provided with straight external toothing which engages in corresponding internal toothing of the steering wheel hub 4, so that a rotational movement of the steering wheel can be transmitted to the steering spindle 2.

A switch module 7 is fastened to the inner casing tube 3. The switch module 7 serves, for example, to accommodate an angle sensor or for the mounting of gearshift levers. For this purpose, it is necessary for the switch module 7 to be held immovably with regard to the rotational movement of the steering wheel and the steering spindle 2.

FIGS. 1 and 2 show the switch module 7 with its centering device 8. The centering device 8 comprises a stator 9 which is configured as a hollow cylinder and the internal diameter of which is adapted to the external diameter of the inner casing tube 3.

An outer ring 11 of an axial bearing 12 is fastened to that end 10 of the centering device 8 which points toward the steering wheel hub 4, while the inner ring 13 of said axial bearing 12 is supported on the steering spindle 2. As a result that the stator 9 remains immovable when the steering spindle 2 rotates.

Clamping jaws 14 are provided in the stator 9, which are distributed over the circumference of the casing tube 3 and are in contact with the front end side 16 of the casing tube 3 by way of an angular support 15. One end 17 of the clamping jaws 14 is mounted on the stator 9 via spring elements 18 in such a way that, when an axial force according to the arrow F acts on the stator 9, the force F is introduced into the clamping jaws 14 via the spring elements 18 which are recessed into the stator 9. The clamping jaws 14 are pulled in uniformly over the circumference of the casing tube 3 by means of the angular support 15, so that all the clamping jaws 14 are centered over the circumference of the casing tube 3.

As can be seen, in particular, from the detailed illustration in FIG. 1b, that face 14a of the clamping jaw 14 which faces the stator 9 extends obliquely to the longitudinal axis L of the steering spindle 2, so that the stator 9 which is moved in the opposite direction to the clamping jaw 14 brings the clamping jaw 14 into contact with the casing tube 3. This effect is reinforced if the inner face 9a of the stator 9 extends parallel to the oblique face 14a of the clamping jaw 14. An elevation 14c is provided on that face 14b which faces the casing tube 3, which elevation 14c is pressed onto the casing tube 3 by the contact of the oblique faces 9a and 14a, depending on how far the stator 9 is moved forward according to the direction of the arrow F, and as a result brings about automatic centering of the entire switch module 7.

Figure 3A:
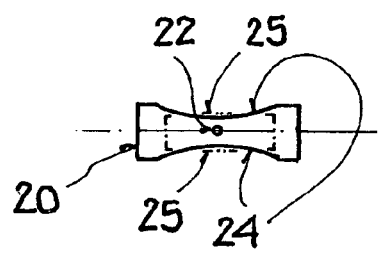
FIG. 3a shows an illustration specifically of a leaf spring; and 3b shows an illustration specifically of a cut-out.
Figure 3B:
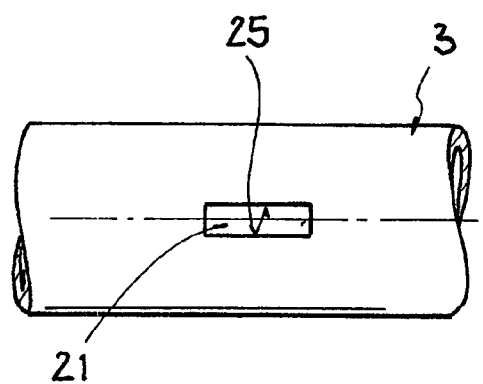

A leaf spring 20 is fastened in the inner wall 19 of the stator 9 for tangential securing of the switch module 7. A cut-out 21 is provided in the casing tube 3 so as to correspond with this, as emerges from FIGS. 3a and 3b.

The center region of the leaf spring 20 is of concave configuration, so that the leaf spring 20 is centered automatically in the cut-out 21, in order to prevent any tolerances in the radial rotation of the switch module 7. If the leaf spring 21 is prestressed appropriately, it always extends through the cut-out until its flanks 24 come into contact with the edges 25 of the cut-out 21.

A control pin 22 which is guided in a trim panel 23 of the steering column arrangement 1 is fastened to the underside of the leaf spring 20. Depending on the position of the leaf spring 20, the control pin 22 protrudes through the trim panel 23 or ends flush with the trim panel 23, so that the correct position of the leaf spring 20 in the cut-out 23 can be determined by a visual check.

The switch module 7 is fit coaxially onto the casing tube 3 until the leaf spring 20 engages with the cut-out 21. Subsequently, the steering wheel is mounted with the steering wheel hub 4 onto the front end 6 of the steering spindle 2. The steering wheel can be aligned with the steering spindle, for example, via a blocking tooth in the straight external toothing of the steering spindle 2 which corresponds with a removed tooth of the internal toothing of the steering wheel hub 4. A contact plug which is provided on the steering wheel will always engage into a plug of the switch module 7 reliably in terms of mounting, as a result of the clear radial alignment between the steering wheel, the steering spindle and the switch module 7. The steering wheel is pulled on with a defined force F by a steering wheel bolt (not shown) which is arranged coaxially with respect to the longitudinal axis L of the steering spindle 2 and penetrates the steering wheel hub 4. This force F causes the stator 9 of the switch module 7 to be acted on via the axial bearing 12 and the force F to be introduced to the clamping jaws 14. The force which acts as a result on the support 15 of the clamping jaws 14, and the interaction of the oblique faces between the clamping jaws 14 in the stator 9, makes automatic centering and radial clamping of the clamping jaws 14 onto the casing tube 3 possible, with the result that the switch module is secured axially. At the same time as the switch module 7 is pulled in the axial direction, the leaf spring 20 is centered in the cut-out 21, so that radial securing is effected. The control pin 22 is moved, as soon as the leaf spring 2 enters the cut-out 21, from an elevated position which projects beyond the trim panel 23 into a lowered position. The fitter can thus check whether the switch module 7 has latched correctly with the leaf spring 20 in the cut-out 21. After the steering wheel and switch module 7 have been mounted, the cabling of an airbag which is accommodated in the steering wheel is laid.

The number of clamping jaws 14 can be selected freely, three clamping jaws being sufficient to secure the switch module 7 axially on the casing tube 3. Each clamping jaw 14 should be assigned a spring element 15. A plurality of leaf springs 20 can also be provided for radial securing.

The invention claimed is:

1. A steering column arrangement comprising:
  a steering spindle which is mounted in a casing tube so as to be rotationally movable; and
  a switch module which is held immovably with respect to the rotational movement of the steering spindle and is fixed radially and axially on the casing tube; wherein,
  the switch module is supported on a bearing arranged on the steering spindle;
  the switch module comprises a centering device which, under a force which is oriented coaxially with respect to the longitudinal axis of the steering spindle, fixes the switch module on the casing tube and clamps the switch module radially,
  the centering device comprises a stator and clamping jaws;
  an elevation protrudes toward the casing tube in a substantially radial direction from a central portion of a first face of a first clamping jaw that faces the casing tube, the elevation contacting an outermost surface of the casing tube and centering the switch module; and
  wherein a second face of the first clamping jaw faces away from the casing tube and toward the stator and extends obliquely with regard to the longitudinal axis of the steering spindle, and wherein the inner face of the stator extends parallel to the oblique face of the clamping jaw.

2. The steering column arrangement as claimed in claim 1, wherein the stator is connected to the bearing.

3. The steering column arrangement as claimed in claim 2, wherein the stator is connected to each clamping jaw via a spring element.

4. The steering column arrangement as claimed in claim 1, wherein the stator is connected to each clamping jaw via a spring element.

5. The steering column arrangement as claimed in claim 1, wherein each clamping jaw is in contact with the casing tube by way of a support.

6. The steering column arrangement as claimed in claim 1, wherein the axial force is applied by means of a steering wheel bolt.

7. The steering column arrangement as claimed in claim 1, wherein the first face of the clamping jaw is spaced apart from the outermost surface of the casing tube based upon an amount of protrusion of the elevation from the first face of the first clamping jaw.

8. The steering column arrangement as claimed in claim 1, further comprising spring elements that are recessed into the stator and provide an axial force on the clamping jaws.

9. A steering column arrangement, comprising:
- a steering spindle which is mounted in a casing tube so as to be rotationally movable; and
- a switch module which is held immovably with respect to the rotational movement of the steering spindle and is fixed radially and axially on the casing tube; wherein,
- the switch module is supported on a bearing arranged on the steering spindle;
- the switch module comprises a centering device which, under a force which is oriented coaxially with respect to the longitudinal axis of the steering spindle, fixes the switch module on the casing tube and clamps it radially,
- the centering device comprises a stator and clamping jaws; and
- a leaf spring, which is separate from the casing tube, engages in a cut-out of the casing tube and is fastened in a recess in an inner wall of the stator,
- wherein the cut-out provides an opening in the casing tube through which the leaf spring protrudes radially toward the steering spindle.

10. The steering column arrangement as claimed in claim 9, wherein each clamping jaw is in contact with the casing tube by way of a support.

11. The steering column arrangement as claimed in claim 9, wherein a first face of a first clamping jaw faces the stator and extends obliquely with regard to the longitudinal axis of the steering spindle.

12. The steering column arrangement as claimed in claim 11, wherein the inner face of the stator extends parallel to the oblique face of the clamping jaw.

13. The steering column arrangement as claimed in claim 12, wherein an elevation protrudes from a second face of the first clamping jaw which faces the casing tube.

14. The steering column arrangement as claimed in claim 9, wherein the axial force is applied by means of a steering wheel bolt.

15. The steering column arrangement as claimed in claim 9, further comprising a control pin fastened to an outer side of the leaf spring.

16. The steering column arrangement as claimed in claim 15, wherein the control pin projects through the switch module to a trim panel of the steering column arrangement.

17. The steering column arrangement as claimed in claim 9, wherein a center region of the leaf spring has a concave configuration.

18. The steering column arrangement as claimed in claim 9, further comprising spring elements that are recessed into the stator and provide an axial force on the clamping jaws.

* * * * *